United States Patent [19]
Wielers et al.

[11] Patent Number: 5,278,114
[45] Date of Patent: Jan. 11, 1994

[54] HYDROCARBON CONVERSION PROCESS AND CATALYST COMPOSITION

[75] Inventors: Antonius F. H. Wielers, Richmond, Tex.; Augustinus C. C. Van Els; Teunis Terlouw, both of Amsterdam, Netherlands; Frank H. H. Khouw, The Hague, Netherlands

[73] Assignee: Shell Oil Company, Houston, Tex.

[21] Appl. No.: 907,964

[22] Filed: Jul. 2, 1992

[30] Foreign Application Priority Data

Jul. 3, 1991 [GB] United Kingdom ............... 9114390

[51] Int. Cl.$^5$ ............................................. B01J 29/06
[52] U.S. Cl. ................................................. 502/67
[58] Field of Search ....................................... 502/67

[56] References Cited

U.S. PATENT DOCUMENTS

| | | |
|---|---|---|
| 3,758,403 | 9/1973 | Rosinski et al. ............ 208/111 |
| 3,769,202 | 10/1973 | Plank et al. . |
| 4,137,152 | 1/1979 | Chester et al. . |
| 4,239,654 | 12/1980 | Gladrow et al. ............ 502/67 |
| 4,340,465 | 7/1982 | Miller et al. . |
| 4,568,655 | 2/1986 | Oleck et al. ............... 502/67 |
| 4,837,396 | 6/1989 | Herbst et al. ............... 502/67 |

FOREIGN PATENT DOCUMENTS

| | | |
|---|---|---|
| 20154-A1 | 12/1980 | European Pat. Off. . |
| 131986-A2 | 1/1985 | European Pat. Off. . |
| 0168979 | 1/1986 | European Pat. Off. . |
| 229609-A2 | 7/1987 | European Pat. Off. . |
| 347003-A1 | 12/1989 | European Pat. Off. . |
| 0347003 | 12/1989 | European Pat. Off. . |
| 355928-A1 | 2/1990 | European Pat. Off. . |
| 0385538 | 9/1990 | European Pat. Off. . |
| 0392590 | 10/1990 | European Pat. Off. . |
| 2445855 | 8/1980 | France . |
| 2231582A | 11/1990 | United Kingdom . |

*Primary Examiner*—Carl F. Dees

[57] ABSTRACT

A process for the preparation of an olefins-containing mixture of hydrocarbons, which process comprises contacting a hydrocarbonaceous feedstock with a zeolitic catalyst at a temperature above 480° C. during less than 10 seconds, whereby the zeolitic catalyst comprises a mixture of a zeolite I and a zeolite II in a matrix, wherein zeolite I has a pore diameter of 0.3 to 0.7 nanometers and zeolite II has a pore diameter greater than 0.7 nanometers, and wherein the catalyst contains at least 25% by weight of zeolitic material. The invention further relates to a catalyst composition comprising a mixture of a zeolite I and a zeolite II in a matrix material, wherein zeolite I has a pore diameter of 0.3 to 0.7 nanometers, zeolite II has a pore diameter greater than 0.7 nanometers, and the composition contains at least 25% by weight of zeolitic material.

16 Claims, No Drawings

HYDROCARBON CONVERSION PROCESS AND CATALYST COMPOSITION

BACKGROUND OF THE INVENTION

1. Field of the Invention

The present invention relates to a process for the preparation of an olefins-containing mixture of hydrocarbons. The present invention further relates to a catalyst composition for the preparation of an olefins-containing mixture of hydrocarbons.

2. Description of the Prior Art

There is a considerable interest in the production of olefins since their reactivity renders them suitable for conversion to still further products. Ethylene and propylene are considered valuable starting materials for chemical processes, while $C_4$ olefins can be used as a starting material for alkylation and/or oligomerization procedures in order to produce high octane gasoline and/or middle distillates. Isobutene can be usefully converted to methyl t-butyl ether.

It is know that hydrocarbonaceous feedstocks, such as light distillates, may be converted to products rich in lower olefins, especially ethylene and propylene, by high temperature steam cracking. The typical product obtained by such steam cracking is not entirely suited to the needs of the chemical industry though in that it results in a relatively high production of methane and a high ratio of ethylene to propylene.

Recently, alternative processes have been developed for the production of lower olefins from a wide range of hydrocarbonaceous feedstocks, for example, as described in European Patent No. 0347003, European Patent No. 0392590 and European Patent No. 0385538. Those processes have been found to give surprisingly high yields of lower olefins, low amounts of methane and a low ratio of ethylene to propylene and $C_4$ olefins when compared with conventional steam cracking.

It has now been found that under comparative reaction conditions, very attractive product slates can be obtained in terms of both lower olefins and gasoline yields when use is made of a specific zeolitic catalyst.

SUMMARY OF THE INVENTION

The present invention relates to a process for the preparation of an olefins-containing mixture of hydrocarbons, which comprises contacting a hydrocarbonaceous feedstock with a zeolitic catalyst at a temperature above about 480° C. for less than about 10 seconds, whereby the zeolitic catalyst comprises a mixture of zeolite I and a zeolite II in a matrix material, wherein zeolite I has a pore diameter of from about 0.3 nanometers to about 0.7 nanometers and zeolite II has a pore diameter greater than about 0.7 nanometers, and wherein the catalyst contains at least about 25% by weight of the zeolitic material. The invention further relates to the catalyst composition utilized in this process.

DESCRIPTION OF THE PREFERRED EMBODIMENTS

The present invention relates to a process for the preparation of an olefins-containing mixture of hydrocarbons. The process comprises contacting a hydrocarbonaceous feedstock with a zeolitic catalyst comprising a mixture of a zeolite I and a zeolite II in a matrix material at a temperature above about 480° C. for less than about 10 seconds wherein the zeolite I utilized has a pore diameter of from about 0.3 nanometers to about 0.7 nanometers and the zeolite II has a pore diameter greater than about 0.7 nanometers and the catalyst contains at least about 25% by weight of the zeolitic material. Reference herein to the zeolitic content of a catalyst is to the content in an equilibrium catalyst, i.e., a catalyst having equilibrium activity.

Utilizing this process, high yields of lower olefins and gasoline and relatively low yields of cycle oils can be obtained. Moreover, the gasoline obtained has an attractive octane number.

The catalyst composition comprises an intimate mixture of the zeolites I and II in a porous matrix material. It may be expected that the use of an intimate mixture of the two zeolites in a porous matrix material would result in an unacceptable loss in conversion over that of a catalyst containing only zeolite II when operating at identical catalyst:oil ratio and contact time, due to the dilution in zeolite II with respect to feedstock, i.e., the lower zeolite II:oil ratio in the catalyst of the invention than in a conventional zeolite II catalyst. It has now surprisingly been found that in a process of the invention use of a catalyst containing at least about 25% by weight of zeolitic material results in a greater conversion when operated at identical catalyst:oil ratio than in a process using catalyst containing only zeolite II.

The zeolitic catalyst preferably contains at least about 30% by weight of the zeolitic material but can suitably contain up to no less than about 50% by weight of zeolitic material. The zeolite I:zeolite II weight ratio of the zeolitic catalyst suitably ranges from about 0.02 to about 10, preferably from about 0.2 to about 1.

The zeolitic I utilized has a pore diameter of from about 0.3 nanometers to about 0.7 nanometers, preferably from about 0.5 nanometers to about 0.7 nanometers. Suitable examples of zeolites I include, but are not limited to: crystallinesilica(silicalite); silicoaluminophosphates (SAPO); chromosilicates; gallium silicates; iron silicates; aluminium phosphates (ALPO); titanium aluminosilicates (TASO); boron silicates; titanium aluminophosphates (TAPO) and iron aluminosilicates. Further examples of zeolite I include: SAPO-4 and SAPO-11 which are described in U.S. Pat. No. 4,440,871; ALPO-11, described in U.S. Pat. No. 4,310,440; TAPO-11, described in U.S. Pat. No. 4,500,651; TASO-45, described in U.S. Pat. No. 4,254,297; aluminium silicates like erionite, ferrierite, theta; and the ZSM-type zeolites such as ZSM-5, ZSM-11, ZSM-35, ZSM-23, and ZSM-38. Preferably, the zeolite I is selected from the group consisting of crystalline (metallo)silicates having a ZSM-5 structure, ferrierite, erionite and mixtures thereof. Suitable examples of crystalline (metallo)silicates with ZSM-5 structure include, but are not limited to: aluminium, gallium, iron, scandium, rhodium and/or chromium silicates as described in e.g., Great Britain Pat. No. 2,110,559.

A significant amount of alkali metal oxide is usually present after the preparation of the zeolite I. The alkali metal can be removed by methods known in the art, such as ion-exchange, optionally followed by calcination, to yield the zeolite in its hydrogen form. In the process of the present invention, preferably the zeolite I is substantially in its hydrogen form.

The average crystallite size of the zeolite I should be less than about 2 micrometers, preferably less than about 1 micrometer. More preferably, zeolite I has an average crystallite size in the range from about 0.01 micrometers to about 0.5 micrometers.

The term crystallite size in this specification is to be regarded as the size of the individual zeolite crystals. These individual crystals may agglomerate into clusters which each may comprise from about 3 to about 10 or more individual crystals. Preferably, zeolite I comprises individual crystals.

The zeolite II has a pore diameter greater than about 0.7 nanometers. Examples of zeolite II include the faujasite-type zeolites, zeolite beta and zeolite omega. Faujasite-type zeolites, including zeolites X and Y, are preferred; with zeolite Y being the most preferred. The zeolite can be in its acidic form, i.e., the form in which the zeolite hardly contains any alkali metal ions.

In the preferred embodiment of the present invention, zeolite I comprises ZSM-5 and zeolite II comprises zeolite Y. The matrix material suitably comprises an inorganic oxide. Suitable matrix materials include refractory oxides such as alumina, silica, silica-alumina, magnesia, titania, zirconia, as well as, natural or synthetic clays, like kaolin, and mixtures thereof.

The hydrocarbonaceous feedstock is contacted with the zeolitic catalyst for less than about 10 seconds. Suitably, the minimum contact time is about 0.1 seconds. Very good results are obtained when the hydrocarbonaceous feedstock is contacted with the zeolitic catalyst from about 0.2 seconds to about 6 seconds.

The process is carried out at a relatively high temperature. It is the combination of high temperature, short contact time and use of the specific catalyst composition which allows the high conversion to lower olefins and gasoline obtained. A preferred temperature range is from about 480° C. to about 900° C., more preferably from 500° C. to about 800° C.

The pressure to be used in the process according to the present invention can be varied within wide ranges. It is, however, preferred that the pressure is such that at prevailing temperature, the mixture of hydrocarbons obtained is substantially in its gaseous phase or brought thereto by contact with the catalyst. This can be advantageous since no expensive compressors, highpressure vessels or other equipment are necessary. A suitable pressure range is from about 1 bar to about 10 bar. Subatmospheric pressure are possible, but not preferred. It can be economically advantageous to operate at atmospheric pressure. Other gaseous materials may be present during the conversion of the hydrocarbonaceous feedstock such as steam and/or nitrogen.

The process according to the present invention can suitably be carried out in a moving bed of catalyst. This is achieved by passing a fluidizing gas through the catalyst bed. The bed of catalyst particles may move upwards or downwards. The bed may be fluidized to the extent that a dispersed catalyst phase is produced when it is desired to operate at very short contact times. When the bed mores upwards as a dispersed phase, for example, as is the case when operating in a riser reactor, a process somewhat similar to fluidized catalytic cracking process is obtained. In this context it should be noted that in conventional fluid catalytic cracking processes, the catalyst particles only contain a relatively small content of zeolitic components, since it is generally strongly believed that catalyst particles containing high amounts of zeolitic components do not fulfill attrition requirements. Moreover, in conventional fluid catalytic cracking processes, the respective zeolitic components, if applied at all, are customarily incorporated in small amounts into separate matrices.

Furthermore, it is contemplated that in processes using respective zeolitic components incorporated in separate matrices an advantageous flexibility in operation is made possible, by the possibility to control the respective amounts of separate zeolitic components in the reactor in response to changes in feedstock or in desired product fraction yields.

In a further aspect of the present invention, it has now been found that in a process according to the invention, a catalyst composition may be used comprising a mixture of zeolite II in a matrix as a first component together with an intimate mixture of zeolite I and zeolite II in a matrix as a second component, whereby flexibility of operation is possible. In this aspect of the invention, it is also possible to maintain a desired respective amount of zeolite I to zeolite II in the reactor despite any variation due to varying hydrothermal and thermal stability of the two zeolites in the regenerator and to varying attrition resistances of the two zeolites.

In the process according to the present invention some coke forms on the catalyst. Therefore it is advantageous to regenerate the catalyst. Preferably, the catalyst is regenerated by subjecting it to a treatment with an oxidizing gas, such as air. A continuous regeneration, similar to the regeneration carried out in a fluidized catalytic cracking process, is especially preferred.

In a further aspect of the invention it is found that use of a zeolite I which has equivalent or greater hydrothermal stability than that of zeolite II is particularly advantageous in a process employing regeneration similar to that carried out in a fluidized catalytic cracking process. Suitably, for example, the zeolite I has a ZSM-5 structure.

The weight ratio of the catalyst used relative to the hydrocarbonaceous feedstock to be converted (catalyst:feedstock weight ratio, kg:kg) may vary widely, for example, up to about 150 kg of catalyst per kg of the hydrocarbonaceous feedstock or even more. Preferably, the catalyst:feedstock weight ratio is from about 5 to about 150, more preferably from about 7 to about 100. If the process is carried out applying a catalyst:feedstock weight ratio ranging from about 20 to about 100, very attractive yields of lower olefins are obtained.

The hydrocarbonaceous feedstock which is to be contacted with the zeolitic catalyst in the process of the present invention can vary within a wide boiling range. Examples of suitable feedstocks are relatively light petroleum fractions such as for instance kerosine fractions. Heavier feedstocks may comprise, for example, vacuum distillates, long residues, deasphalted residual oils and atmospheric distillates, for example gas oils and vacuum gas oils. Light fractions such as $C_{3-4}$ hydrocarbons (e.g. LPG), naphtha or gasoline fractions can suitably be co-processed with the feedstock. Another attractive feedstock comprises a mixture of hydrocarbons obtained in a Fischer-Tropsch hydrocarbon synthesis process.

The present invention further relates to a catalyst composition comprising a mixture of a zeolite I and a zeolite II in a matrix material, wherein the zeolite I has a pore diameter from about 0.3 nanometers to about 0.7 nanometers, zeolite II has a pore diameter greater than about 0.7 nanometers, and the catalyst composition contains at least about 25% by weight of zeolitic material.

Suitably, the catalyst composition comprises an intimate mixture of the zeolites I and II in a porous matrix mixture. The above implies that a catalyst particle of the catalyst composition according to the present invention contains both zeolites. The zeolitic catalyst preferably contains at least about 30% by weight of zeolitic material, suitably up to no less than about 50% by weight of zeolitic material.

The zeolitic catalyst according to the present invention suitably has a zeolite I:zeolite II weight ratio from about 0.1 to about 10, preferably from about 0.2 to about 3.

In a further aspect of the invention it has surprisingly been found that in a process of the invention use of a catalyst of the invention having a zeolite I:zeolite II weight ratio ranging from about 0.4 to about 2.5, more preferably from about 0.5 to about 2.0, most preferably from about 0.55 to about 2.0, results in a dramatic reduction in code formation with respect to use of a catalyst comprising only zeolite II. For example, a catalyst of the invention may have a weight ratio of substantially 1:1. Catalyst having weight ratios in these ranges may be used at higher severity for a constant coke formation than a catalyst comprising only zeolite II allowing a further increase in conversion and gasoline yield.

The zeolite I has a pore diameter from about 0.3 nanometers to about 0.7 nanometers, preferably from about 0.5 nanometers to about 0.7 nanometers. Suitable and preferred zeolites I, zeolites II and matrix materials include those described hereinbefore. A suitable method for preparing the catalyst composition according to the present invention comprises first mixing matrix material with water. The slurry so obtained in is then extensively stirred to keep the solids in suspension, and the pH of the slurry is adjusted to the desired value. Subsequently, a physical mixture of the powderous zeolitic components is added to the slurry together with sufficient water to maintain a slurry and to arrive at the desired solids concentration. Thereafter, the slurry is spray-dried and the spray-dried catalyst particles obtained are finally calcined.

The invention will be further described by the following Illustrative Embodiments which are provided for illustration purposes and are not to be construed as limiting the invention.

ILLUSTRATIVE EMBODIMENTS

Illustrative Embodiment 1

Catalyst A according to the invention was prepared as follows: 30 wt % zeolite Y was co-blended with 10 wt % ZSM-5, dispersed in 60 wt % matrix material and the resulting composition was co-sprayed dried. The particles obtained were calcined. Thus, the preparative method for catalyst A was analogous with that of the commercially available catalyst B (ex AKZO) which comprises 30 wt % zeolite Y in matrix.

Particles of catalyst A and B were steamed to attain an equilibrium activity.

Illustrative Embodiment 2

The feedstock in this embodiment was flashed distillate having the following properties:

| IBP, °C. | 260 |
|---|---|
| 20% wt | 422 |
| 50% wt | 483 |
| 90% wt | 578 |

-continued

| FBP | 620 |
|---|---|
| carbon, % wt | 86.0 |
| hydrogen % wt | 12.2 |
| sulfur, % wt | 1.6 |
| nitrogen, ppmw | 432 |

The flashed distillate was treated in a riser reactor in which concurrently a flow of feedstock and catalyst A particles, which comprised an intimate mixture of Y zeolite and ZSM-5 was passed upwards. For comparison purposes, the experiment was repeated with catalyst B which comprised Y zeolite. Experiments were carried out at 2 bar pressure. Further process conditions and the results of the experiments are indicated in the table below, in which the sign "=" indicates olefinic unsaturation.

TABLE I

| | Catalyst A | Catalyst B |
|---|---|---|
| Process Conditions: | | |
| Reactor temperature, °C. | 520 | 520 |
| Catalyst:oil ratio, g/g | 6.8 | 6.8 |
| Contact time, seconds | 4.2 | 4.1 |
| Conversion | 75.7% | 74.9% |
| Product, % w on feed: | | |
| $C_2$ minus | 4.1 | 4.0 |
| $C_3$ | 1.2 | 1.1 |
| $C_3=$ | 6.6 | 5.1 |
| $C_4$ | 3.7 | 4.2 |
| $C_4=$ | 8.9 | 6.5 |
| $C_5-$ 22° C. (gasoline) | 44.6 | 47.0 |
| 221-370° C. | 16.4 | 16.8 |
| 370 + °C. | 7.9 | 8.3 |
| Coke | 6.6 | 7.0 |
| | 100.0 | 100.0 |

From the above results it will be seen that by operation with catalyst A, the yield of $C_3=$ and $C_4=$ was significantly increased, while the total yield of $C_3=$, $C_4=$ and gasoline was also increased with respect to operation with catalyst B.

What is claimed is:

1. A catalyst composition comprising a zeolite I and a zeolite II in a matrix material, wherein the zeolite I has a pore diameter from about 0.3 nanometers to about 0.7 nanometers, an average crystallite size from about 0.01 micrometers to about 0.5 micrometers and is substantially in its hydrogen form, zeolite II has a pore diameter greater than about 0.7 nanometers, and the catalyst composition contains at least about 25% by weight of the zeolitic material.

2. The catalyst composition of claim 1 wherein the composition comprises a mixture of zeolite II in a matrix material with an intimate mixture of zeolite I and zeolite II in a matrix material.

3. The catalyst composition of claim 2 wherein the composition contains at least 30% by weight of zeolitic material.

4. The catalyst composition of claim 2 wherein the zeolite I:zeolite II weight ratio ranges from about 0.01 to about 10.

5. The catalyst composition of claim 4 wherein the zeolite I:zeolite II weight ratio ranges from about 0.2 to about 3.

6. The catalyst composition of claim 2 wherein zeolite I has a pore diameter from about 0.5 to about 0.7 nanometers.

7. The catalyst composition of claim 2 wherein zeolite II comprises a faujasite-type zeolite.

8. The catalyst composition of claim 2 wherein the zeolite II comprises zeolite Y.

9. The catalyst composition of claim 16 wherein the zeolite I is selected from the group consisting of crystalline (metallo)silicates having a ZSM-5 structure, ferrierite, or mixtures thereof.

10. The catalyst composition of claim 2 wherein the matrix material comprises at least one refractory oxide.

11. The catalyst composition of claim 1 wherein the zeolite I:zeolite II weight ratio ranges from about 0.01 to about 10.

12. The catalyst composition of claim 1 wherein zeolite II comprises a faujasite-type zeolite.

13. The catalyst composition of claim 1 wherein the zeolite II comprises zeolite Y.

14. The catalyst composition of claim 1 wherein the zeolite I is selected from the group consisting of crystalline (metallo)silicates having a ZSM-5 structure, ferrierite, and mixtures thereof.

15. The catalyst composition of claim 1 wherein the matrix material comprises at least one refractory oxide.

16. A catalyst composition comprising a mixture of zeolite II in a matrix material with an intimate mixture of a zeolite I and a zeolite II in a matrix material, wherein the zeolite I has a pore diameter from about 0.3 nanometers to about 0.7 nanometers, an average crystallite size from about 0.01 micrometers to about 0.5 micrometers and is substantially in its hydrogen form, zeolite II has a pore diameter greater than about 0.7 nanometers, and the catalyst composition contains at least about 25% by weight of the zeolitic material.

* * * * *